(12) United States Patent
Steinsträter et al.

(10) Patent No.: US 7,874,418 B2
(45) Date of Patent: Jan. 25, 2011

(54) MULTI DRIVE UNIT FOR CONVEYOR AND LONG CONVEYOR IMPLEMENTING A PLURALITY OF MULTI DRIVE UNITS

(75) Inventors: Dieter Steinsträter, Neuenkirchen (DE); Carsten Seib, Nordhorn (DE)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 12/383,947

(22) Filed: Mar. 30, 2009

(65) Prior Publication Data

US 2009/0242359 A1 Oct. 1, 2009

(30) Foreign Application Priority Data

Mar. 28, 2008 (DK) ................ 2008 00457

(51) Int. Cl.
*B65G 23/14* (2006.01)
(52) U.S. Cl. ...................... 198/833; 198/849
(58) Field of Classification Search ............... 198/833, 198/849, 850–853
See application file for complete search history.

(56) References Cited

U.S. PATENT DOCUMENTS

| | | | |
|---|---|---|---|
| 3,858,473 A | 1/1975 | Bystron | |
| 3,994,390 A | 11/1976 | Peterson, Jr. | |
| 5,303,817 A * | 4/1994 | Kissee | 198/833 |
| 5,630,500 A * | 5/1997 | Conrad | 198/833 |
| 5,934,862 A | 8/1999 | Brown et al. | |
| 6,186,732 B1 * | 2/2001 | Brown et al. | 198/833 |

FOREIGN PATENT DOCUMENTS

GB 1500909 2/1978

* cited by examiner

*Primary Examiner*—James R Bidwell
(74) *Attorney, Agent, or Firm*—James Creighton Wray; Meera P. Narasimhan

(57) ABSTRACT

Multi drive unit for propelling a modular conveyor belt, where the conveyor belt is made from a plurality of substantially identical belt links, where each link has a top and bottom surface, two side faces and a front and rear edge, where eye parts project from the front and rear edges, where the eye parts are separated by openings, such that the eye parts along the front edge of one belt link may intermesh in the openings provided between the eye parts along the rear edge of an adjacent belt link, and that apertures provided in the eye parts perpendicular to the intended travelling direction are superposed and a hinge pin may be inserted in order to hingely connect the overlapping eye parts and thereby adjacent belt links, wherein the unit comprises a plurality of parallely arranged axles, where each axle is provided with a plurality of sprocket wheels, each sprocket wheel having a number of projecting teeth distributed along its circumference, where the sprocket wheels on the same axle are spaced along the axle by way of spacing members, and where at least one axle is coupled to a drive.

5 Claims, 2 Drawing Sheets

MULTI DRIVE UNIT FOR CONVEYOR AND LONG CONVEYOR IMPLEMENTING A PLURALITY OF MULTI DRIVE UNITS

This application claims the benefit of Danish Application No. PA 2008 00457 filed Mar. 28, 2008, which is hereby incorporated by reference in its entirety.

FIELD OF THE INVENTION

The present invention is directed to a novel and inventive multi drive unit for propelling a modular conveyor belt as well as a conveyor structure incorporating such a multi drive unit.

BACKGROUND OF THE INVENTION

For some special applications it is desirable to provide very long conveyor belts in the range of 150-200 meters or even longer. This is usually done by arranging a plurality of smaller conveyor units in an array in that when conveyor belts reach certain lengths a number of undesirable problems arise.

One of these problems is that as the conveyor belt reaches a certain length loads on the conveyor belt will create horizontal wave actions in the belt such that for example personnel using the conveyor belt as a transporter will feel a movement in the surface which is very undesirable. Therefore historically the long conveyor belt has been made up of a number of conveyor structures, but this, in turn, creates the problem that if a person is working or walking on this belt, special attention has to be paid when switching from one conveyor belt to the adjacent conveyor belt. For example in the automobile industry in order to avoid accidents safety zones have been created adjacent to the ends of the conveyor belts where workers are not allowed to perform their tasks. This leads to wasted space and extra long assembly lines which increases the overall costs of the manufacturing facility.

In the art systems have been proposed in for example U.S. Pat. No. 5,934,862, U.S. Pat. No. 3,994,390, U.S. Pat. No. 3,858,473, GB 1 500 909 and WO2008/070444. Common for all these systems is the fact that they use one or two independent sub-belts to propel the main conveyor belt, and thereby to distribute the engagement force provided by the driving means—typically an electric motor turning one or more sprocket wheels engaging the underside of a belt.

OBJECT OF THE INVENTION

It is consequently desirable to be able to create very long conveyor belts where the disadvantages mentioned above as well as other undesirable effects are eliminated.

DESCRIPTION OF THE INVENTION

The invention addresses this by providing a multi drive unit for propelling a modular conveyor belt, where the conveyor belt is made from a plurality of substantially identical belt links, where each link has a top and bottom surface, two side faces and a front and rear edge, where eye parts project from said front and rear edges, where the eye parts are separated by openings, such that the eye parts along the front edge of one belt link may intermesh in the openings provided between the eye parts along the rear edge of an adjacent belt link, and that apertures provided in the eye parts perpendicular to the intended travelling direction are superposed and a hinge pin may be inserted in order to hingely connect the overlapping eye parts and thereby the melt links, wherein the unit comprises a plurality of parallely arranged axles, where each axle is provided with a plurality of sprocket wheels, each sprocket wheel having a number of projecting teeth distributed along its circumference, where the sprocket wheels on the same axle are spaced along the axle by means of spacing members, and where at least one axle is coupled to drive means able to rotate said at least one axle, and that a belt is arranged around at least two sprocket wheels on at least two adjacent axles, such that rotation of a first axle by means of the belt causes the adjacent axle to rotate, such that all the plurality of axles are connected two and two by one or more belts, where the propulsion force is transmitted either via the teeth engaging the conveyor belt, or the belts engaging the underside of the conveyor belt.

Traditionally the conveyor belts are propelled by sprocket wheels arranged on axles in either end of the conveyor belt where a drive motor is attached to the drive axle of the sprocket wheel structure such that the conveyor belt will be propelled solely by the sprocket wheels in either end of the conveyor structure. By having the multi drive unit according to the invention it is possible to introduce additional drive units during the course of the conveyor belt such that the conveyor belt as such does not have to transfer the propelling force drive from the sprocket wheels in either end.

A similar construction is known from the German document DE3231961 where a plurality of drive units are arranged underneath a web or rubber conveyor belt i.e. a conveyor belt having a substantially continuous surface whereas the present invention is directed to a conveyor belt made out of modular belt modules connected in a hingely fashion. The prior art device transfers its propulsion force by bringing the belt of the additional drive unit into contact with the under surface of the main conveyor belt and solely by friction propelling the main conveyor belt. All though the prior art devices makes it possible to create longer conveyor belts with the inherent problems in the relatively flexible web/rubber based conveyor belts, this construction does not address the major problems relating to horizontal displacement in the belt and furthermore does not provide an adequate force in order to propel very long conveyor belts. This is due to the fact that in order to create enough friction in the contact between the main conveyor belt and the conveyor belt arranged around the additional drive unit these two conveyor belts have to be in intermit contact. This usually causes a slight bulge in the main conveyor belt which will feel as an uncomfortable and unsafe footing for personnel working on such a conveyor belt. Furthermore, the present invention by positively engaging the main conveyor belt by the teeth on the sprocket wheel actually engaging the underside of the conveyor belt creates for a much safer and reliable transfer of forces and at the same time due to the modular characteristics of both the main conveyor belt and the sprocket wheels the positive engagement between the multi drive unit and the main conveyor belt also dampens the horizontal wave action such that although the conveyor surface of the main conveyor may be very long the multi drive unit will split the long conveyor belt into sections with respect to the wave action such that the wave action is substantially eliminated.

Another aspect is the fact that for very long conveyor belts substantial forces have to be transferred via the conveyor belts structure and therefore the conveyor belt has to have certain dimension in order to be able to satisfactory transfer these forces in the conveyor belt structure itself without cracking or breaking. For this purpose conveyor belts, for example as described in the prior art document DE 3231961 tend to be very wide in order to be able to transfer the forces and again take up extra space in the production facility with the added cost of unusable manufacturing floor space. With the present invention the multi-drive unit makes it possible to engage positively and transfer higher loads due to the engagement of the multi-drive unit with the underside of the main conveyor belt such that higher forces may be transferred through the conveyor belt even for relatively narrow conveyor belts.

In a further advantageous embodiment the plurality of axles are arranged in a common plane and that this common plane is inclined relative to the plane formed by the conveyor belt, whereby the axles will be progressively closer to the belt in the belts drive direction.

With this configuration it is ensured that even if the eye parts in the main conveyor belt should have been displaced slightly in relation to the sprockets on the multi-drive unit, the gradual engagement by inclining the multi-drive unit relative to the main conveyor belt, a positive and firm engagement will be achieved due to the gradual engagement. Furthermore, the gradual engagement due to the inclined plane of the multi-drive unit's axles will create a gradual contact such that the surface of the main conveyor belt will not be exposed to a force perpendicular to the belt which could create an uncomfortable bulge or hindrance for personnel working on the belt and as such the force transferal from the multi-drive unit to the conveyor belt is created solely in the plane of the belt without deflecting the belt in a vertical direction.

In a still further advantageous embodiment one or more drive-belts are arranged around at least some of the sprocket wheels, where the drive-belts are made from modular belt links assembled in the same manner as the modular conveyor belt, and where a majority of the modular belt links of the drive-belts are provided with arched projecting teeth arranged corresponding to and for engagement with the eye parts of the modular belt links of the conveyor belt.

By providing the drive-belts between the sprocket wheels arranged on different axles the coordinated rotation of all the sprocket wheels is ensured such that by driving the multi-drive unit solely on one axle the driving forces will due to the connection with drive-belts from one axle to the other transfer the forces in a completely synchronous manner to all the axles such that an even force distribution will be conveyed through the main conveyor belt. The arched projecting teeth are shaped such that they will have a close fit with the front part of the eye parts such that a very positive and reliable contact will be created by the arched teeth of the modular belt links of the drive-belts and the modular belt modules of the main conveyor belt.

In a further advantageous embodiment two rows of teeth are arranged on each modular belt link of the drive-belt, where the teeth in each row are staggered and oppositely arched, whereby the teeth are provided for engagement with the eye-parts on respectively the front and rear edge of adjacent belt links of the conveyor belt.

By this arrangement the dampening capabilities of the multi-drive unit is further improved in that the teeth facing in one direction will propel the conveyor belt further thereby transferring the propulsion force to the plane of the main conveyor belt and the teeth oriented in the opposite direction and spaced from the first set of teeth such that the front eye parts on the modular belt modules of the main conveyor belt will be accommodated by these teeth dampens the forward wave or pulse action relative to and adjacent belt link in the main conveyor belt whereby two adjacent modular belt modules in the main conveyor belt are fixed relative to each other whereby any translation between adjacent conveyor belts will be reset, i.e. the dampening of the conveyor belt will be complete as the main conveyor belt passes over a multi-drive unit.

The invention is also directed to a conveyor structure comprising a long endless conveyor belt, where the conveyor belt is made from a plurality of substantially identical belt links, where each link has a top and bottom surface, two side faces and a front and rear edge, where eye parts projects from said front and rear edges, where the eye parts are separated by openings, such that the eye parts along the front edge of one belt link may intermesh in the openings provided between the eye parts along the rear edge of an adjacent belt link, and that apertures provided in the eye parts perpendicular to the intended travelling direction are superposed and a hinge pin may be inserted in order to hingely connect the overlapping eye parts and thereby adjacent belt links, characterised in that the conveyor belt is arranged around a sprocket wheel in each end, such that the conveyor has an upper transport surface and a lower belt return, and that at least one multi drive unit according to any of claims 1 to 4 is/are arranged along the underside of the upper transport surface, for providing dampening and extra propulsion of the conveyor belt.

It is clear that by providing multi-drive units as already discussed above it is possible to create a conveyor structure which is at least in theory endless due to the propulsion capabilities of the multi-drive unit and at the same time their dampening capabilities such that the main conveyor belt will be stable and without shock-waves during the entire course of the conveyor belt due to the propelling and dampening of the multi-drive units arranged at intervals under the main conveyor belt.

In a further advantageous embodiment the multi-drive unit is arranged as slave units to the main sprocket wheel arranged in one end of the long conveyor. By providing the multi-drive unit as slave units their propulsion force will be synchronized completely to the main sprocket wheels such that a homogenous speed in all drive-units be it the main sprocket wheels or the multi-drive units arranged along the conveyor structure that provides for homogenous force distribution and thereby even, smooth motion of the main conveyor belt.

DESCRIPTION OF THE DRAWING

The invention will now be explained with reference to the accompanying drawings wherein.

DETAILED DESCRIPTION OF AN EMBODIMENT

Figure 1:
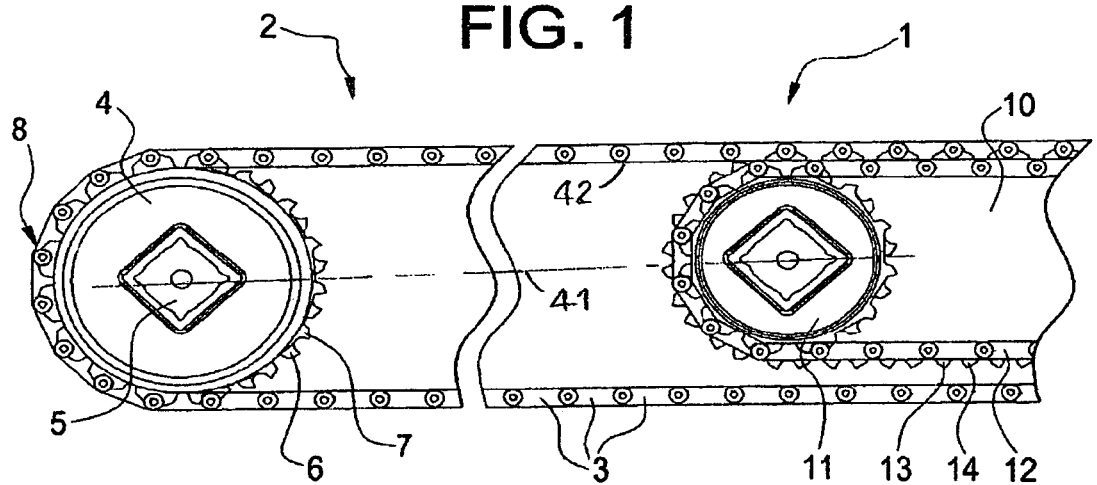
FIG. 1 illustrates a side view of a conveyor structure comprising a main conveyor belt and a multi-drive unit.

FIG. 1 illustrates a conveyor structure 1 seen in a side view. The conveyor structure 1 comprises a main transporting conveyor 2 assembled from a plurality of substantially identical modular belt links 3, for example as available from uni-chains A/S, Denmark. The endless conveyor 2 is in either end arranged around a sprocket wheel 4 where the propulsion for the conveyor structure 1 is created by rotating the axle 5 of the sprocket wheel 4 such that the teeth 6, 7 of the sprocket wheel will engage corresponding recesses in the conveyor belt 2 between the modular belt modules 3 as illustrated with reference number 8 such that the rotational movement from the sprocket wheel 4 will create the movement of the conveyor belt 2. In the embodiment illustrated the conveyor belt may be propelled in any direction due to the configuration of the teeth 6, 7 of the sprocket wheel 4.

Furthermore, a multi-drive unit 10 according to the present invention is illustrated arranged under the conveyor belt 2 of the conveyor structure 1. The multi-drive unit 10 comprises a sprocket wheel 11 comparable in configuration to the sprocket wheel 4 of the main conveyor but of a smaller size.

Figure 2:
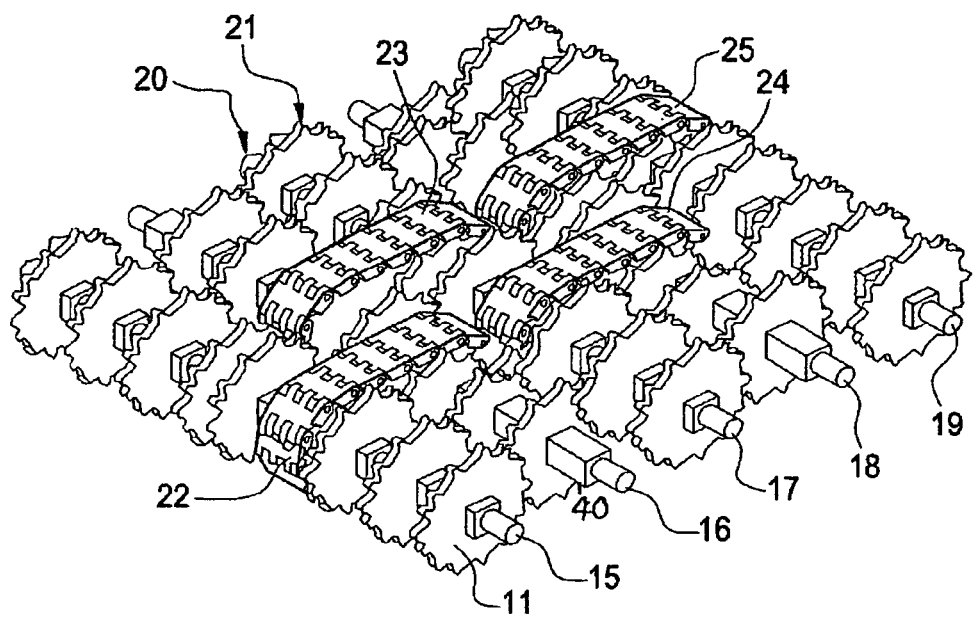
FIG. 2 illustrates a sectional view of a multi-drive unit.

The illustration in FIG. 1 illustrates one end of a conveyor structure, and it is obvious that a second sprocket and axle assembly 4, 5 will be present at the opposite end of the conveyor belt 2 and likewise for the multi-drive unit 10 one or more sprocket wheel structures will be present, see for example FIG. 2, but for illustrative purposes a simplified illustration is provided.

Around the sprocket wheel 11 a drive belt 12 is arranged where the drive belt comprises modular belt modules as will be explained with reference to FIG. 3. The drive belt 12 comprises teeth 13, 14 which in the same manner as explained above with respect to the teeth 6, 7 of the sprocket wheel 4 engages the ends of the eye parts of the modular conveyor belt 2.

Turning to FIG. 2 an example of a multi-drive unit according to the invention having five axles, 15-19, is illustrated. On each axle 15-19 a plurality of sprocket wheels, in this embodiment 10 sprocket wheels 11, are arranged on each axle (15-19). The drive unit illustrated in FIG. 2 is designed such that the teeth 20, 21 directly will engage the underside of the conveyor belt 2 and thereby create the propulsion for the conveyor structure 1. The sprocket wheels on the same axle are spaced along the axle by means of spacing members 40. The plurality of axles are arranged in a common plane 41, and this common plane is inclined relative to the plane 42 formed by the conveyor belt, whereby the axles will be progressively closer to the belt in the belt drive direction.

In order to synchronize the rotation of the axles 15-19, synchronous drive belts 22-25 are provided such that the synchronous drive belts coordinate the rotation of two adjacent axles, for example the synchronous drive belt 22 ensures that the axles 15 and 16 rotate at the same speed and the synchronous drive belt 23 ensures that the axles 16 and 17 rotate at the same speed etc. In this manner the multi-drive unit according to the invention will have a huge number of engagement points, namely all the teeth presently engaging the conveyor belt which transfers the propelling force to the conveyor belt in a synchronous manner providing for even propulsion. At the same time, as already explained above, the provision of two teeth, 20, 21 engaging eye parts on adjacent belt links creates the dampening effect, and due to the large number of axles in this example 5 a dampening effect will be created on a relatively large area of the conveyor belt such that an effective dampening effect is provided by the multi-drive unit according to the present invention.

Figure 3:
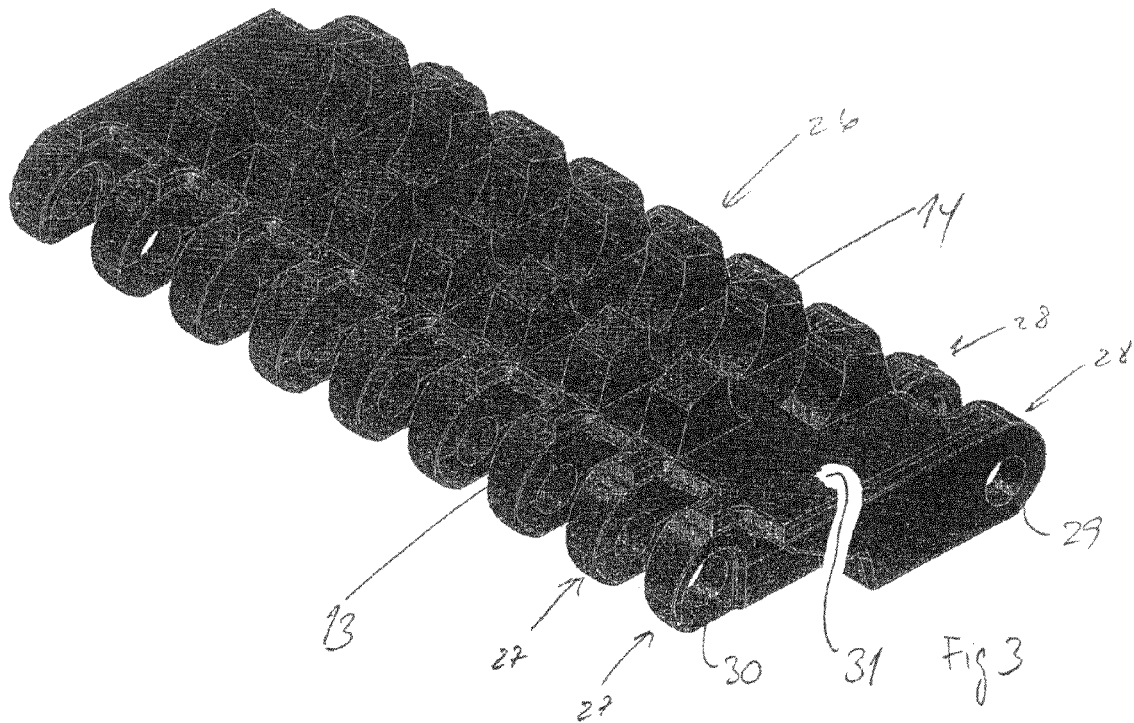
FIG. 3 illustrates a special belt module

Turning to FIG. 3 examples of the modules 26 from which the drive belt 12 in FIG. 1 is constructed are illustrated. The module is provided with eye parts 27 along one edge and opposite eye parts 28 along the opposite edge such that when two identical modular belt modules are to be connected, the eye parts 28 are inserted in the openings between the eye parts 27 and an adjacent belt link whereby the apertures 29, 30 are superposed such that a hinge pin may be inserted transversely of the travelling direction of the drive belt hingely connecting to adjacent belt modules. On the top surface 31 of the belt module 26 the engagement teeth 13, 14 are provided for engagement with eye parts corresponding to the eye parts 27, 28 of this module provided in the belt module 3 of the conveyor belt 2 (see FIG. 1).

Figure 4:
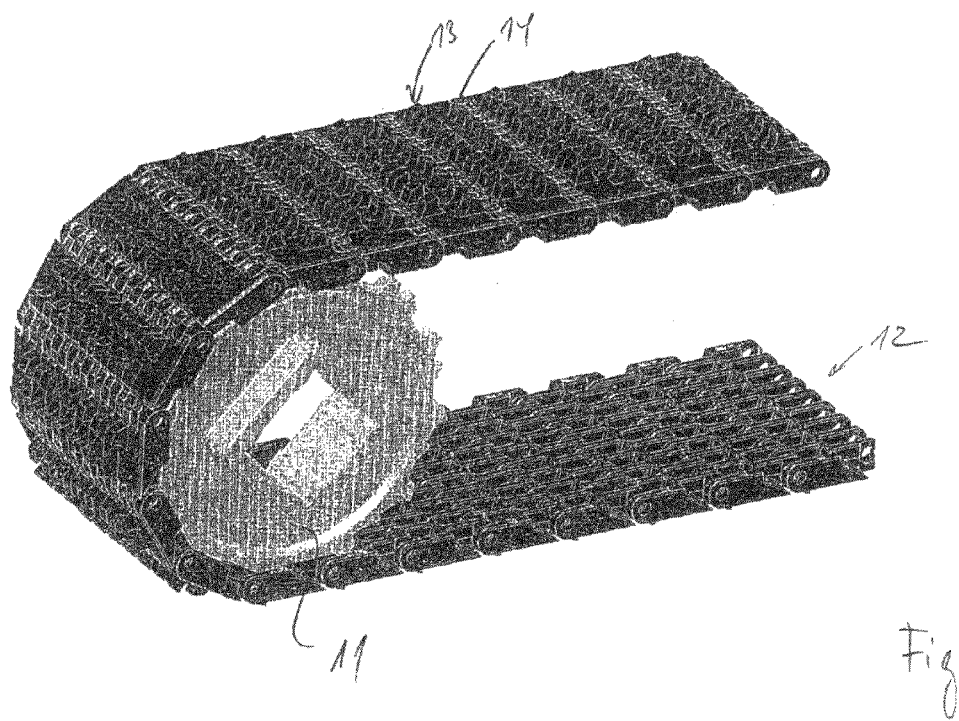
FIG. 4 illustrates a section of a multi-drive units drive-belt

In FIG. 4 is illustrated the situation where a number of modules 26 are assembled into a drive belt 12 arranged around the sprocket 11. From this illustration it is evident that a huge number of teeth 13, 14 will be able to be in engagement with the overlying conveyor belt 2 in order to provide the necessary propulsion and at the same time the required dampening such that very long conveyor belts may be constructed.

The invention claimed is:

1. Multi drive unit for propelling a modular conveyor belt, where the conveyor belt is made from a plurality of substantially identical belt links, where each link has a top and bottom surface, two side faces and a front and rear edge, where eye parts projects from said front and rear edges, where the eye parts are separated by openings, such that the eye parts along the front edge of one belt link may intermesh in the openings provided between the eye parts along the rear edge of an adjacent belt link, and that apertures provided in the eye parts perpendicular to the intended travelling direction are superposed and a hinge pin may be inserted in order to hingely connect the overlapping eye parts and thereby adjacent belt links, wherein the unit comprises a plurality of parallely arranged axles, where each axle is provided with a plurality of sprocket wheels, each sprocket wheel having a number of projecting teeth distributed along its circumference, where the sprocket wheels on the same axle are spaced along the axle by means of spacing members, and where at least one axle is coupled to drive means able to rotate said at least one axle, and that a belt is arranged around at least two sprocket wheels on at least two adjacent axles, such that rotation of a first axle by means of the belt causes the adjacent axle to rotate, such that all the plurality of axles are connected two and two by one or more belts, where the propulsion force is transmitted either via the teeth engaging the conveyor belt, or the belts engaging the underside of the conveyor belt, and further that one or more drive-belts are arranged around at least some of the sprocket wheels, where the drive-belts are made from modular belt links assembled in the same manner as the modular conveyor belt, and where a majority of the modular belt links of the drive-belts are provided with arched projecting teeth arranged corresponding to and for engagement with the eye parts of the modular belt links of the conveyor belt.

2. Multi drive unit according to claim 1 wherein the plurality of axles are arranged in a common plane and that this common plane is inclined relative to the plane formed by the conveyor belt, whereby the axles will be progressively closer to the belt in the belts drive direction.

3. Multi drive unit according to claim 1, wherein two rows of teeth are arranged on each modular belt link of the drive-belt, where the teeth in each row are staggered and oppositely arched, whereby the teeth are provided for engagement with the eye-parts on respectively the front and rear edge of adjacent belt links of the conveyor belt.

4. Conveyor structure comprising a long endless conveyor belt, where the conveyor belt is made from a plurality of substantially identical belt links, where each link has a top and bottom surface, two side faces and a front and rear edge, where eye parts projects from said front and rear edges, where the eye parts are separated by openings, such that the eye parts along the front edge of one belt link may intermesh in the openings provided between the eye parts along the rear edge of an adjacent belt link, and that apertures provided in the eye parts perpendicular to the intended travelling direction are superposed and a hinge pin may be inserted in order to hingely connect the overlapping eye parts and thereby adjacent belt links, characterised in that the conveyor belt is arranged around a sprocket wheel in each end, such that the conveyor has an upper transport surface and a lower belt return, and that at least one multi drive unit according to claim 1 is/are arranged along the underside of the upper transport surface, for providing dampening and extra propulsion of the conveyor belt.

5. Conveyor according to claim 4 wherein the multi drive unit(s) are arranged as slave units to the main sprocket wheel arranged in one end of the long conveyor.

* * * * *